US012761941B2

(12) United States Patent
Corrie

(10) Patent No.: US 12,761,941 B2
(45) Date of Patent: Oct. 13, 2026

(54) MECHANISM TO ALLOW FOR MONITORING OF DISCONNECTED COMPONENTS IN CONTAINER ORCHESTRATION SYSTEMS

(71) Applicant: VMware, Inc., Palo Alto, CA (US)

(72) Inventor: Benjamin John Corrie, Tréal (FR)

(73) Assignee: VMware LLC, Palo Alto, CA (US)

( * ) Notice: Subject to any disclaimer, the term of this patent is extended or adjusted under 35 U.S.C. 154(b) by 332 days.

(21) Appl. No.: 18/488,313

(22) Filed: Oct. 17, 2023

(65) Prior Publication Data

US 2025/0123872 A1 Apr. 17, 2025

(51) Int. Cl.
*G06F 12/00* (2006.01)
*G06F 9/455* (2018.01)

(52) U.S. Cl.
CPC .................... *G06F 9/45558* (2013.01); *G06F 2009/45583* (2013.01); *G06F 2009/45591* (2013.01); *G06F 2009/45595* (2013.01)

(58) Field of Classification Search
CPC ....... G06F 9/45558; G06F 2009/45583; G06F 2009/45591; G06F 2009/45595
USPC ........................................................... 718/1
See application file for complete search history.

(56) References Cited

U.S. PATENT DOCUMENTS 9,798,567 B2 10/2017 Hu et al.
9,983,891 B1 5/2018 Christensen
2017/0093923 A1* 3/2017 Duan .................. G06F 11/2028
2017/0214550 A1* 7/2017 Kumar ................ H04L 41/5045
2018/0314541 A1 11/2018 Khan et al.
2021/0034479 A1* 2/2021 Fukuta ................ G06F 9/45558
2021/0311762 A1 10/2021 Shepherd et al.
2021/0311765 A1 10/2021 Subramanian et al.
2022/0197684 A1 6/2022 Desai et al.
2022/0326994 A1* 10/2022 Mueller .............. G06F 21/6218
2023/0185580 A1 6/2023 Cohen et al.

FOREIGN PATENT DOCUMENTS

EP 3974994 A1 3/2022
WO WO-2022037268 A1 * 2/2022 ......... G06F 9/45558

OTHER PUBLICATIONS

Extended European Search Report, European Application No. 24202268.9 dated Feb. 28, 2025, 9 pages.
U.S. Appl. No. 18/241,160, Non-Final Office Action dated Mar. 12, 2026, 57 pages.
U.S. Appl. No. 18/241,160, Notice of Allowance dated Jul. 7, 2026, 25 pages.

* cited by examiner

*Primary Examiner* — Mardochee Chery
(74) *Attorney, Agent, or Firm* — King Intellectual Asset Management

(57) ABSTRACT

The disclosure provides a method for monitoring a disconnected component in a container orchestration system. The method generally includes obtaining, by an abstraction layer, monitoring data associated with the component while the component is connected to a network, wherein the abstraction layer comprises at least one proxy component acting as a proxy for the component in the container orchestration system; intercepting, by the abstraction layer, a query intended for the component, wherein the query originated from one or more monitoring agents configured to continuously monitor at least the component; and responding to the query based on the monitoring data obtained by the abstraction layer for the component.

20 Claims, 6 Drawing Sheets

MECHANISM TO ALLOW FOR MONITORING OF DISCONNECTED COMPONENTS IN CONTAINER ORCHESTRATION SYSTEMS

CROSS-REFERENCE TO RELATED APPLICATIONS

This application claims the benefit of and priority to U.S. Provisional Patent Application No. 63/585,758, filed on Sep. 27, 2023, the entire contents of which are hereby incorporated by reference.

BACKGROUND

Modern applications are applications designed to take advantage of the benefits of modern computing platforms and infrastructure. For example, modern applications can be deployed in a multi-cloud or hybrid cloud fashion. A multi-cloud application may be deployed across multiple clouds, which may be multiple public clouds provided by different cloud providers or the same cloud provider or a mix of public and private clouds. The term, "private cloud" refers to one or more on-premises data centers that may have pooled resources allocated in a cloud-like manner. Hybrid cloud refers specifically to a combination of public cloud and private clouds. Thus, an application deployed across a hybrid cloud environment consumes both cloud services executing in a public cloud and local services executing in a private data center (e.g., a private cloud). Within the public cloud or private data center, modern applications can be deployed onto one or more virtual machines (VMs), containers, application services, and/or the like.

A container is a package that relies on virtual isolation to deploy and run applications that depend on a shared operating system (OS) kernel. Containerized applications (also referred to as "containerized workloads"), can include a collection of one or more related applications packaged into one or more containers. In some orchestration systems, a set of one or more related containers sharing storage and network resources, referred to as a pod, are deployed as a unit of computing software. Container orchestration systems automate the lifecycle of containers, including such operations as provisioning, deployment, monitoring, scaling (up and/or down), networking, and load balancing.

Kubernetes® (K8S®) software is an example open-source container orchestration platform that automates the deployment and operation of such containerized applications. In particular, Kubernetes may be used to create a cluster of interconnected nodes, including (1) one or more worker nodes that run the containerized applications (e.g., in a worker plane) and (2) one or more control plane nodes (e.g., in a control plane) having control plane components running thereon that control the cluster. Control plane components make global decisions about the cluster (e.g., scheduling), and can detect and respond to cluster events (e.g., starting up a new pod when an application deployment's intended replication is unsatisfied). In some cases, a node, used to run containerized applications or control plane components in a Kubernetes cluster, is a physical machine. In some cases, a node used to run containerized applications or control plane components in a Kubernetes cluster is a VM configured to run on a physical machine running a hypervisor.

Although initially intended for use in the cloud, Kubernetes can also be used to manage and deploy infrastructure (e.g., pods, containers, etc.) and containerized applications in other environments, including at the edge. Edge computing refers to the processing and storage of data in a dispersed manner, for example, closer to consumers and/or sensors (e.g., referred to as locations at the "edge"). Edge computing can be beneficial for applications that require low latency and/or have data transmission or processing challenges. However, edge computing requires time and cost-efficient deployment and management of such applications to many locations and possibly many underlying compute types to realize these benefits.

Kubernetes is an example tool developers and operations teams leverage for such deployment and management of these applications deployed on disparate compute nodes, including at the edge. In particular, Kubernetes provides a management layer that enables dynamic orchestration and scalability to effectively manage multiple nodes (e.g., worker nodes) configured to execute containerized applications at the edge (e.g., edge nodes). Executing applications at the edge allows such application to be closer to their respective sources of data (e.g., thereby reducing latency) while still receiving the management and orchestration benefits of the cloud. Kubernetes also helps to provide security features, such as role-based access control, network segmentation, and/or encryption, in such edge deployments.

While Kubernetes brings many benefits for managing containerized applications, it does have some limitations when it comes to edge environments, including the monitoring and management of Kubernetes edge components and/or the applications executing thereon. Kubernetes components may also be referred to herein as "Kubernetes objects" and include, for example, nodes, containers, pods, and/or the like instantiated in a Kubernetes deployment. Kubernetes edge components are Kubernetes components deployed at the edge. Monitoring and management of Kubernetes components is performed both asynchronously and synchronously. For example, a control plane of a Kubernetes cluster may include a cluster store (etcd) that stores configuration file(s) made up of one or more manifests that declare intended system infrastructure and applications to be deployed in the cluster. Kubernetes components can be created, updated, and deleted based on configuration file(s) 182 to represent the state of the cluster, and a status of each of these components may be stored in cluster store (etcd) (e.g., node status, pod status, container status, etc.). Cluster store (etcd) replication is asynchronous by definition, and thus provides a mechanism for asynchronously monitoring, at least, the status of Kubernetes components. Other data from Kubernetes components, such as application logs written to a standard output stream (stdout) and/or a standard error (stderr) stream and stored at the edge, may be accessed synchronously via an API server also deployed on the control plane of the cluster. For example, a Kubernetes cluster has a "hub-and-spoke" API pattern where all API usage from worker nodes in the cluster, or the pods and containers they run, terminates at the API server. The control plane and the worker node(s) in the cluster may access APIs provided by the API server to interact with each other.

Synchronous means for monitoring data generated and stored at the edge (e.g., such as stderr and/or stdout logs) generally requires a reliable and continuous network connection to the components being monitored, to allow for the continuous retrieval of such data. In edge computing, however, network connectivity at the edge is often limited and/or sporadic. Thus, it may be challenging, or in some cases, impossible, to monitor data of components (e.g., such as applications) deployed at the edge. Further, for security reasons, it may not be desirable for the nodes to expose APIs through which monitoring data can be read. As such, effective and continuous monitoring of edge components, although critical, may not be feasible using conventional monitoring solutions.

Additionally, a node controller also deployed on the control plane of a Kubernetes cluster may regularly monitor the health of edge nodes deployed in the cluster. For example the node controller may be configured to determine the reachability of nodes, and further, may reschedule pods running on nodes determined to be unreachable and/or unresponsive for a threshold period of time (e.g., reschedule on different nodes in the cluster). This presents a technical problem in edge computing where edge nodes may be periodically disconnected and/or disconnected for lengthy periods of time.

It should be noted that the information included in the Background section herein is simply meant to provide a reference for the discussion of certain embodiments in the Detailed Description. None of the information included in this Background should be considered as an admission of prior art.

SUMMARY

One or more embodiments provide a method for monitoring a disconnected component in a container orchestration system. The method generally includes obtaining, by an abstraction layer, monitoring data associated with the component while the component is connected to a network. The abstraction layer may include at least one proxy component acting as a proxy for the component in the container orchestration system. The method generally includes intercepting, by the abstraction layer, a query intended for the component. The query may have originated from one or more monitoring agents configured to continuously monitor at least the component. The method generally includes responding to the query based on the monitoring data obtained by the abstraction layer for the component.

Further embodiments include a non-transitory computer-readable storage medium comprising instructions that cause a computer system to carry out the above methods, as well as a computer system configured to carry out the above methods.

BRIEF DESCRIPTION OF THE DRAWINGS

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1A:
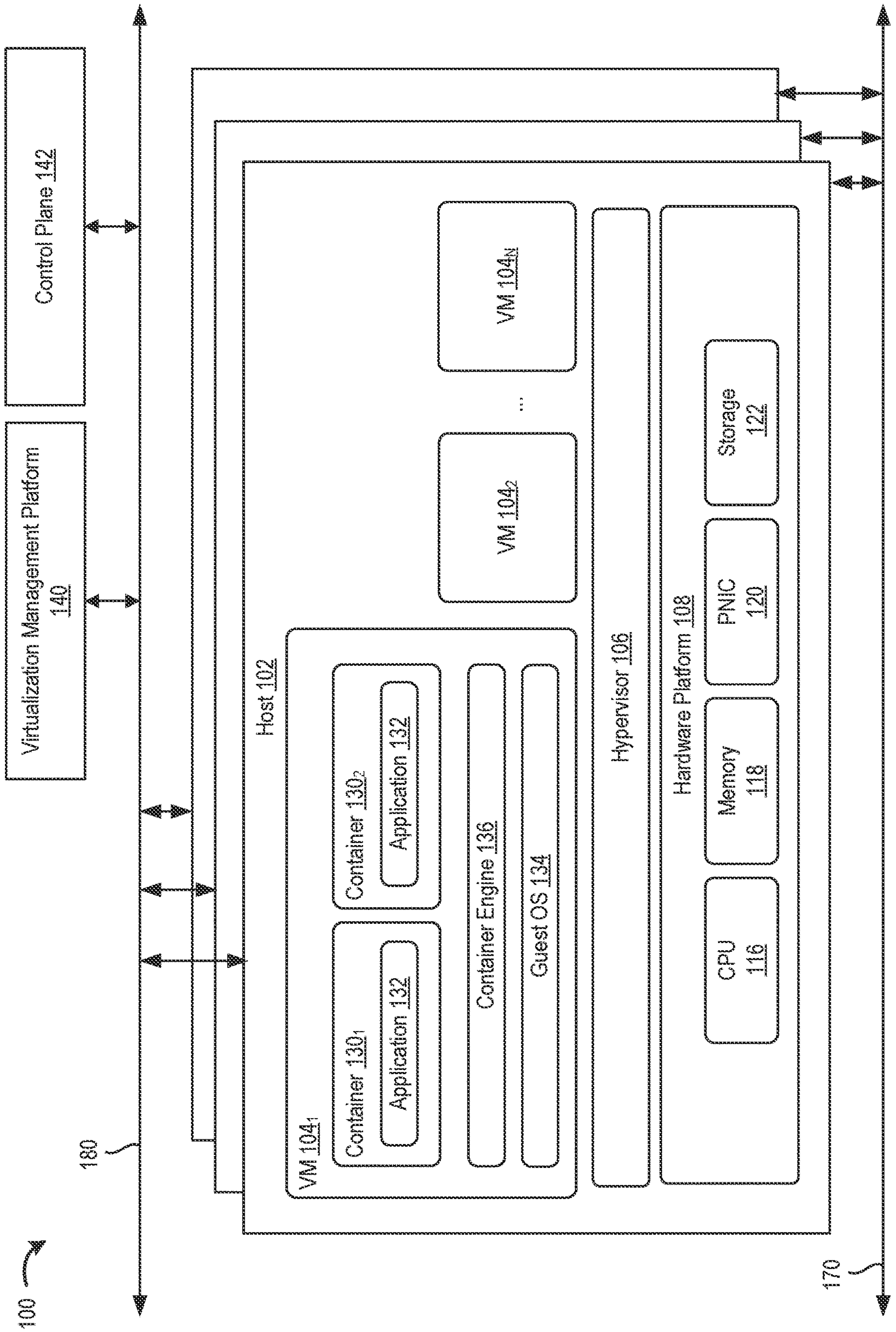
FIG. 1A illustrates a computing system in which embodiments described herein may be implemented.

Techniques for monitoring components, and more specifically, disconnected components, in a container orchestration system, are described herein. As described above, a container orchestration system capable of system monitoring includes (1) a control plane configured to monitor one or more monitored components and (2) a worker plane having the one or more monitored components. The components may refer to entities used to run containerized applications in the system, and may include nodes (e.g., hosts and/or virtual machines (VMs)), pods, and/or containers. As used herein, components that (1) are configured to have limited connectivity to a network (e.g., for security reasons), (2) have sporadic connectivity to a network (e.g., due to poor network connection), and/or (3) are unable, for one or more reasons, to expose application programming interfaces (APIs) through which monitoring data can be read may be referred to as "disconnected components." Example disconnected components may include components deployed at one or more edge locations in a container orchestration system (also referred to herein as "edge components") given their limited connectivity.

As described above, the control plane of the container orchestration system may include a node controller used to regularly determine the reachability of nodes running one or more of the monitored components, such that monitoring data from these components and/or the node (e.g., where the node is a monitored component itself) may be obtained. This presents a technical problem in clusters where monitored components are deployed on edge nodes (e.g., example disconnected components), given their limited connectivity. In particular, the node controller may often mark edge nodes, running one or more components, as unresponsive or "dead" and attempt to reschedule these components on different in the cluster. As such, obtaining monitoring data from components deployed at the edge, e.g., "disconnected components," may not be feasible.

To overcome the aforementioned technical problems associated with monitoring disconnected components, such as components deployed on edge nodes, and improve upon the state of the art, a first technique described herein proposes pushing (e.g., periodically, occasionally, etc.) monitoring data (e.g., for one or more disconnected components) stored at a disconnected node to an abstraction layer introduced in the system, specifically when the disconnected node is connected to the network. For example, an edge node may be configured to connect to the network every five minutes; thus, at each of these five minute intervals, agents deployed on the node may push monitoring data stored at the node to the abstraction layer. Further, a second technique described herein proposes enabling the abstraction layer to periodically poll the disconnected node for monitoring data. specifically during times when the disconnected node is connected to the network. The abstraction layer in either approach may include one or more proxy components (e.g., proxy nodes), each designed to act as a proxy for one or more disconnected nodes (e.g., edge nodes) in the system (e.g., one proxy node per edge node or one proxy node for multiple edge nodes). Unlike the disconnected node(s), each of the proxy component(s) may have a reliable connection to the network and thus be able to continuously communicate with the node controller and provide monitoring data, relayed to the proxy component(s) from the disconnected components, to the control plane. As such, the components of the control plane, including the node controller, may be tricked into believing that the disconnected node(s) are (1) continuously reachable and (2) that they are receiving live monitoring data directly from each disconnected node in the system (e.g., via APIs), when they are actually receiving data from the abstraction layer of the system.

Deceiving the node controller and other components of the control plane as such allows for monitoring of disconnected nodes, and/or application and/or components running on the disconnected nodes, using monitoring solutions designed based on an assumption that these monitored nodes have a reliable connection to the network. In particular, these monitoring solutions may expect that each node in the system is able to continuously publish data to an API, accessible over the network, to allow for such synchronous communication, and thus enable continuous monitoring by the monitoring agent(s). However, using the techniques described herein, the abstraction layer may respond to queries, from the node controller and/or other components of the control plane requesting data associated with the disconnected nodes and their components, instead of the disconnected nodes themselves. Accordingly, such monitoring system(s) may continue to be used in container-based systems with one or more disconnected nodes, for example, including in Kubernetes edge architecture. Though example embodiments provided herein are described with respect to monitoring disconnected nodes in Kubernetes edge architecture, other embodiments may involve applying similar techniques to monitor disconnected components in other types of environments.

The monitoring techniques described herein help with the proactive management of container-based clusters, and more specifically, with the proactive management of disconnected components in these clusters. Monitoring eases management of containerized infrastructure by tracking utilization of cluster resources including memory, central processing unit (CPU), and/or storage. Further, monitoring enables users (e.g., cluster administrators) to identify issues such as insufficient resources, failures, pods that are unable to start, nodes that cannot join the cluster, and/or the like such that mitigating action may be taken to correct these issues.

FIG. 1A is a block diagram that illustrates a computing system 100 in which embodiments described herein may be implemented. Computing system 100 includes one or more hosts 102, a management network 180, a data network 170, and a virtualization management platform 140.

Host(s) 102 may be geographically co-located servers on the same rack or on different racks in any arbitrary location in the data center. Host(s) 102 may be in a single host cluster or logically divided into a plurality of host clusters. Each host 102 may be configured to provide a virtualization layer, also referred to as a hypervisor 106, that abstracts processor, memory, storage, and networking resources of a hardware platform 108 of each host 102 into multiple VMs 1041 to 104N (collectively referred to as VMs 104 and individually referred to as VM 104) that run concurrently on the same host 102.

Host(s) 102 may be constructed on a server grade hardware platform 108, such as an x86 architecture platform. Hardware platform 108 of each host 102 includes components of a computing device such as one or more processors (CPUs) 116, memory (random access memory (RAM)) 118, one or more network interfaces (e.g., physical network interfaces (PNICs) 120), storage 122, and other components (not shown). CPU 116 is configured to execute instructions that may be stored in memory 118, and optionally in storage 122. The network interface(s) enable hosts 102 to communicate with other devices via a physical network, such as management network 180 and data network 170.

In certain embodiments, hypervisor 106 runs in conjunction with an operating system (OS) (not shown) in host 102. In some embodiments, hypervisor 106 can be installed as system level software directly on hardware platform 108 of host 102 (often referred to as "bare metal" installation) and be conceptually interposed between the physical hardware and the guest OSs executing in the VMs 104. It is noted that the term "operating system," as used herein, may refer to a hypervisor. One example of hypervisor 106 that may be configured and used in embodiments described herein is a VMware ESXi™ hypervisor provided as part of the VMware vSphere® solution made commercially available by VMware, Inc. of Palo Alto, CA.

Each of VMs 104 implements a virtual hardware platform (not shown) that supports the installation of a guest OS 134 that is capable of executing one or more applications 132. Guest OS 134 may be a standard, commodity operating system. Examples of a guest OS include Microsoft Windows, Linux, and/or the like. Applications 132 may be any software program, such as a word processing program.

In certain embodiments, computing system 100 includes a container orchestrator. The container orchestrator implements a container orchestration control plane (also referred to herein as the "control plane 142"), such as a Kubernetes control plane, to deploy and manage applications 132 and/or services thereof on hosts 102 using containers 130. In particular, each VM 104 includes a container engine 136 installed therein and running as a guest application under control of guest OS 134. Container engine 136 is a process that enables the deployment and management of virtual instances, referred to herein as "containers," in conjunction with OS-level virtualization on guest OS 134 within VM 104 and the container orchestrator. Containers 130 provide isolation for user-space processes executing within them. Containers 130 encapsulate an application (and its associated applications 132) as a single executable package of software that bundles application code together with all of the related configuration files, libraries, and dependencies required for it to run.

Control plane 142 runs on a cluster of hosts 102 and may deploy containerized applications 132 as containers 130 on the cluster of hosts 102. Control plane 142 manages the computation, storage, and memory resources to run containers 130 in the host cluster.

In certain embodiments, control plane 142 deploys and manages applications as pods of containers 130 running on hosts 102, either within VMs 104 or directly on an OS of hosts 102. A pod is a group of one or more containers 130 and a specification for how to run the containers 130. A pod may be the smallest deployable unit of computing that can be created and managed by control plane 142.

Figure 1B:
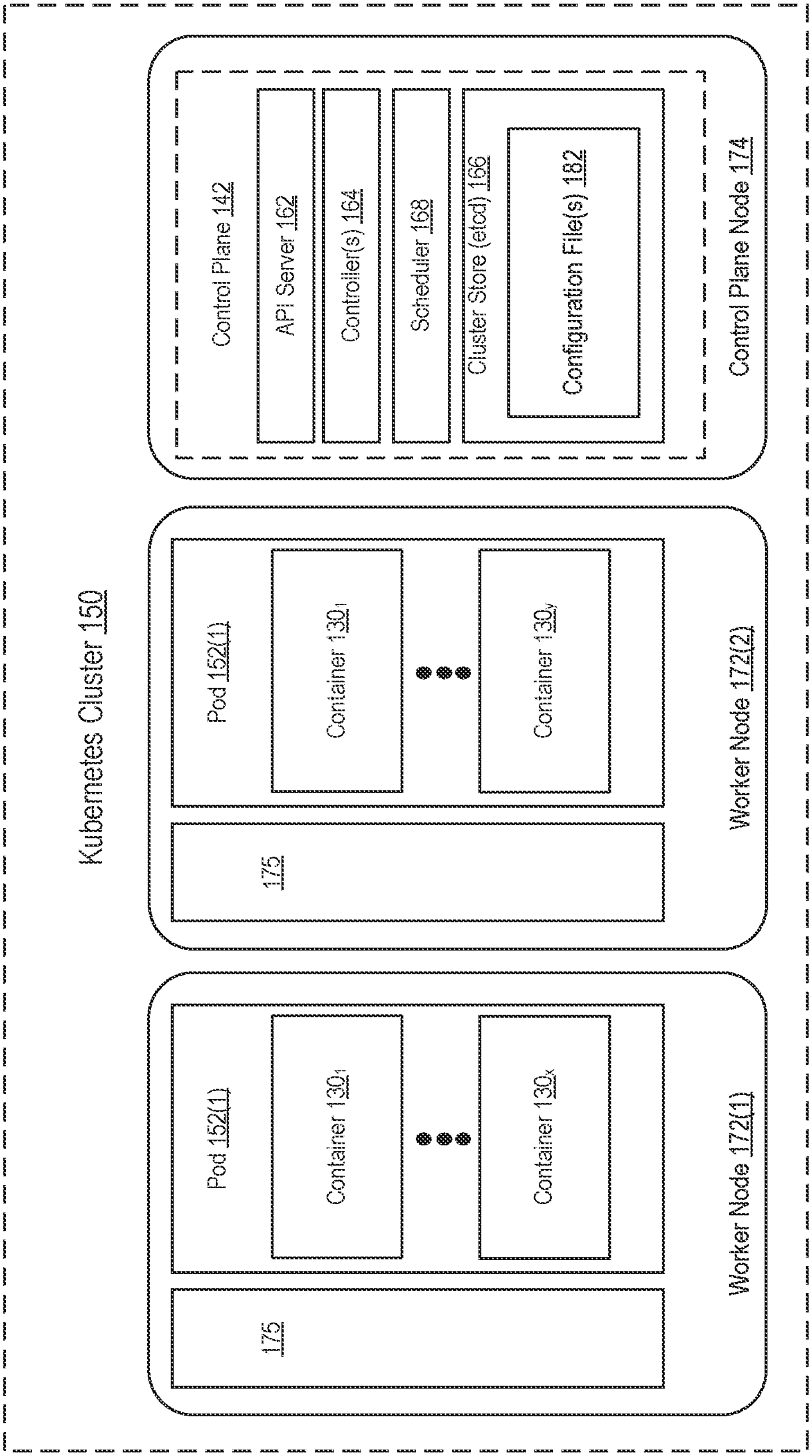
FIG. 1B illustrates an example container-based cluster for running containerized applications in the computing system of FIG. 1A, according to an example embodiment of the present disclosure.

An example container-based cluster for running containerized applications is illustrated in FIG. 1B. While the example container-based cluster shown in FIG. 1B is a Kubernetes cluster 150, in other examples, the container-based cluster may be another type of container-based cluster based on container technology, such as Docker Swarm clusters. As illustrated in FIG. 1B, Kubernetes cluster 150 is formed from a cluster of interconnected nodes, including (1)

one or more worker nodes 172 that run one or more pods 152 having containers 130 and (2) one or more control plane nodes 174 having control plane components running thereon that control the cluster (e.g., where a node is a physical machine, such as a host 102, or a VM 104 configured to run on a host 102). The worker nodes 172 can be used to execute various applications 132 and software processes using containers 130.

Each worker node 172 includes a kubelet 175. Kubelet 175 is an agent that helps to ensure that one or more pods 152 run on each worker node 172 according to a defined state for the pods 152, such as defined in a configuration file. Each pod 152 may include one or more containers 130. Further, a kubelet 175, running on a worker node 172, may provide a mechanism by which control plane 142 (and more specifically, an API server 162 of control plane 142, described below) communicates with the worker node 172. In some cases, the connection between control plane 142 and the kubelet 175 is used for fetching logs for components (e.g., pods 152) running on the worker node 172. In certain aspects, kubelet 175 is further configured to update control plane 142 with information about pod(s) 152 running on the same worker node 172 as the updating kubelet 175.

Control plane 142 (e.g., running on one or more control plane nodes 174) includes components such as an API server 162, controller(s) 164, a cluster store (etcd) 166, and scheduler(s) 168. Control plane 142's components make global decisions about Kubernetes cluster 150 (e.g., scheduling), as well as detect and respond to cluster events.

API server 162 operates as a gateway to Kubernetes cluster 150. As such, a command line interface, web user interface, users, and/or services communicate with Kubernetes cluster 150 through API server 162. One example of a Kubernetes API server 162 is kube-apiserver. The kube-apiserver is designed to scale horizontally—that is, this component scales by deploying more instances. Several instances of kube-apiserver may be run, and traffic may be balanced between those instances.

API server 162 also exposes a hypertext transfer protocol secure (HTTPS) that allows different components in Kubernetes cluster 150 to communicate with one another. For example, the HTTPS connectivity may allow components in Kubernetes cluster 150 to update cluster store (etcd) 166 of control plane 142 (described in detail below). Updates to the cluster store (etcd) 166 may include status updates for one or more components, such as worker node 172 status, pod 152 status, etc. For example, kubelet 175 running on worker node 172(1) may use the HTTPS connectivity to update cluster store (etcd) 166 and read from the cluster.

Controller(s) 164 is responsible for running and managing controller processes in Kubernetes cluster 150. As described above, control plane 142 may have (e.g., four) control loops called controller processes, which watch the state of Kubernetes cluster 150 and try to modify the current state of Kubernetes cluster 150 to match an intended state of Kubernetes cluster 150. An example controller 164 deployed on control plane 142 includes a node controller. The node controller is responsible for determining the reachability/responsiveness of worker nodes 172 in Kubernetes cluster 150.

Scheduler(s) 168 is configured to allocate new pods 152 to worker nodes 172.

Cluster store (etcd) 166 is a data store, such as a consistent and highly-available key value store, used as a backing store for Kubernetes cluster 150 data. In certain embodiments, cluster store (etcd) 166 stores configuration file(s) 182, such as JavaScript Object Notation (JSON) or YAML files, made up of one or more manifests that declare intended system infrastructure and applications to be deployed in Kubernetes cluster 150. Kubernetes objects (also referred to as Kubernetes components), or persistent entities, can be created, updated, and deleted based on configuration file(s) 182 to represent the state of Kubernetes cluster 150. A Kubernetes object is a "record of intent"—once an object is created, the Kubernetes system will constantly work to ensure that object is realized in the deployment. Example objects include pods, services, volumes, namespaces, deployments, replication controllers, and/or the like, which are supported and can be created/manipulated by a Kubernetes API.

In certain embodiments, containerized application orchestration capabilities, provided by Kubernetes, are extended to nodes deployed at the edge. For example, control plane 174 of Kubernetes cluster 150 illustrated in FIG. 1B, may be deployed in a cloud while worker nodes 172, running containerized applications, are deployed at various edge locations (e.g., referred to herein as "edge nodes"). A number of benefits may be realized by adopting this edge computing architecture, such as improved cost savings, improved application performance, and/or improved privacy of application data. For example, for applications with large amounts of data, it may be more efficient to process data at the edge rather than paying for the bandwidth required to process that data in the cloud. Further, by moving computing resources closer to users, latency may be reduced, thereby resulting in improved application performance. This reduced latency and reduced bandwidth cost, as a result of fewer round trips to a data center, may also allow for the possibility of new application functionality and/or features. Additionally, by keeping more data at the edge and away from centralized data centers, security breaches at the data center may have little, or no effect, on application data maintained at the edge.

To realize such benefits of managing containerized applications at the edge, effective monitoring of edge nodes and their components may be critical. In particular, the decentralized architecture may demand high levels of monitoring to help ensure that the system as a whole, as well as components and containerized applications running therein, are performing as expected. Some monitoring solutions implemented to perform this monitoring may rely on an ability of Kubernetes components, deployed at the edge, to synchronously read and write data to and from APIs, accessible over a network, to synchronize monitoring data from the edge to the cloud. Components deployed at the edge may not have this capability, however, due to (1) limited connectivity configured for these components, (2) poor or erratic connectivity at the edge, and/or (3) an inability of these components to expose APIs through which monitoring data can be read. As such, synchronizing monitoring data from the edge to the cloud to allow for effective monitoring of these edge components may be challenging.

Figure 2:
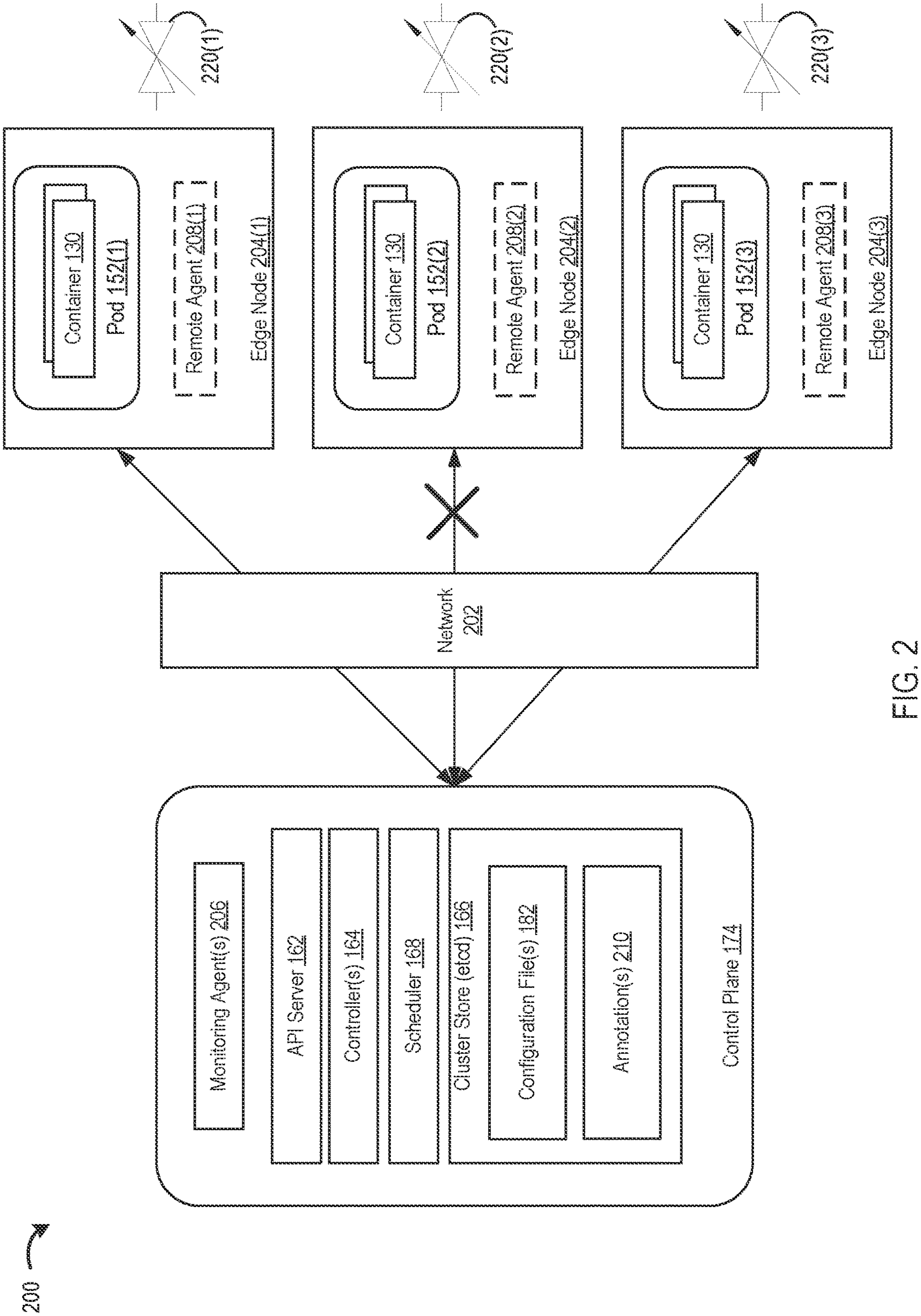
FIG. 2 illustrates example challenges with monitoring components deployed at edge locations in a container orchestration system, according to an example embodiment of the present disclosure.

FIG. 2 illustrates example challenges with monitoring components deployed at edge locations in a container orchestration system 200. Container orchestration system 200 may be an example of Kubernetes cluster 150, illustrated in FIG. 1B, having a control plane 174 and three worker nodes deployed at various edge locations and referred to as edge nodes 204(1)-204(3)) (collectively referred to as "edge nodes 204").

Although not meant to be limiting to this particular example, each edge node 204 may be running one or more applications (e.g., in containers 130) to manage control valves 220(1)-220(3) in a factory (e.g., one or more applications on edge node 204(1) are used to monitor and manage the opening and closing of control valve 220(1), one or more applications on edge node 204(2) are used to monitor and manage the opening and closing of control valve 220(2), and one or more applications on edge node 204(3) are used to monitor and manage the opening and closing of control valve 220(3)). To monitor application performance at each of these edge nodes 204, as well as a state and/or health of each of the components deployed at the edge (e.g., edge nodes 204, pods 152, containers 130) and used to run the containerized applications, one or more monitoring agents 206 may be deployed on control plane 174.

Monitoring agent(s) 206 may be configured to monitor application performance, as well as a state and/or health of components deployed at the edge using various techniques. For example, in certain embodiments, monitoring agent(s) are configured to analyze monitoring data received from one or more edge nodes via APIs. In certain embodiments, monitoring agent(s) are configured to analyze monitoring data provided to monitoring agent(s) 206 over a network 202 by one or more remote agents 208 deployed on edge nodes 204. A remote agent 208, when deployed on an edge nodes 204, may be configured to collect monitoring data from the edge node 204, and/or its components (e.g., pod 152, container 130) deployed on the edge node 204 and/or applications running thereon.

In certain embodiments, monitoring agent(s) 206 are configured to analyze component logs generated on each edge node 204 (not shown). For example, a manifest for a pod 152 may declare that a container 130, belonging to the pod 152, is to write its logs to a standard output stream, once per second. These logs may be collected by a remote agent 208 running on a same edge node 204 as the pod 152 and the container 130. In some cases, remote agent 208 provides (e.g., pushes) these logs to API server 162 on control plane 174, to allow for analysis of these logs by monitoring agent(s) 206. In some other cases, these logs are requested (e.g., pulled) by control plane 174 such that monitoring agent(s) 206 are able to analyze the logs.

It is noted that the above-described techniques (e.g., push and/or pull logs from edge node(s) 204) used to monitor a state, health, and/or performance of edge node(s) 204, and/or applications and/or components running on edge node(s) 204, in container orchestration system 200, are only example techniques that may be used. In other words, the above-described monitoring techniques are not an exhaustive list, and many other monitoring techniques may be used to scrape data at the edge, synchronize data from the edge to the cloud, and analyze data to provide an effective monitoring solution.

The above-described techniques assume that components deployed at the edge are able to provide monitoring data to monitoring agent(s) 206 on control plane 174 (e.g., via one or more of the described techniques), and further have a reliable connection to network 202 to be able to do so. However, in edge deployments, this assumption may not always be true.

For example, based on a location of where edge node 204(2) is deployed, edge node 204(2) may have erratic or poor network connectivity thereby limiting the ability of edge node 204(2), and more specifically remote agent 208(2) deployed on edge node 204(2), to communicate monitoring data to control plane 174. As another example, edge node 204(2) may have limited connectivity to network 202. In particular, to limit connection to edge node 204(2) and thus enhance its security, ports on edge node 204(2), configured to accept connections and/or packets from other entities when opened and reject otherwise, may be open 25% of the time and closed the remaining 75%. Accordingly, an ability of edge node 204(2) to connect to network 202 to provide monitoring data to monitoring agent(s) 206 may be limited based on the amount of time ports of edge node 204(2) are configured to be open. As another example, to further enhance security of edge node 204(2), edge node 204(2) may not be enabled to expose APIs through which monitoring data can be read, even in cases where a reliable connection to network 202 is realized by edge node 204(2). Effective monitoring of components deployed at the edge with such network and/or API limitations (or other similar limitations) (referred to herein as "disconnected components") may not be feasible in existing monitoring solutions.

In order to overcome technical problems associated with monitoring disconnected nodes, and/or components running thereon, in some monitoring solutions, such as those described above with respect to FIG. 2, embodiments described herein enable (1) a disconnected node, via a remote agent deployed on the disconnected node, to push (e.g., periodically, occasionally, etc.) monitoring data to an abstraction layer introduced in the system and/or (2) the abstraction layer to pull data stored on the disconnected node, via communication with the remote agent deployed on the disconnected node, when the disconnected node is connected to the network. The abstraction layer may include a proxy component, such as a node proxy, designed to act as a proxy for the disconnected node. Unlike the disconnected node, the node proxy may be have a reliable connection to the network and thus be continuously reachable by a node controller and/or monitoring agent(s) deployed on a control plane. As such, the proxy component may be continuously reachable and thus continuously communicate monitoring data, relayed to the node proxy from the disconnected node, to the cloud. Accordingly, when monitoring data is requested from the disconnected node, for example, via a query from a monitoring agent in the cloud, the request may be intercepted and served by the node proxy acting as the disconnected component. Monitoring data provided to the monitoring agent may trick the monitoring agent into believing the monitoring agent is receiving live monitoring data directly from the intended disconnected node, when really the data is being provided by the node proxy of the disconnected component.

Figure 3A:
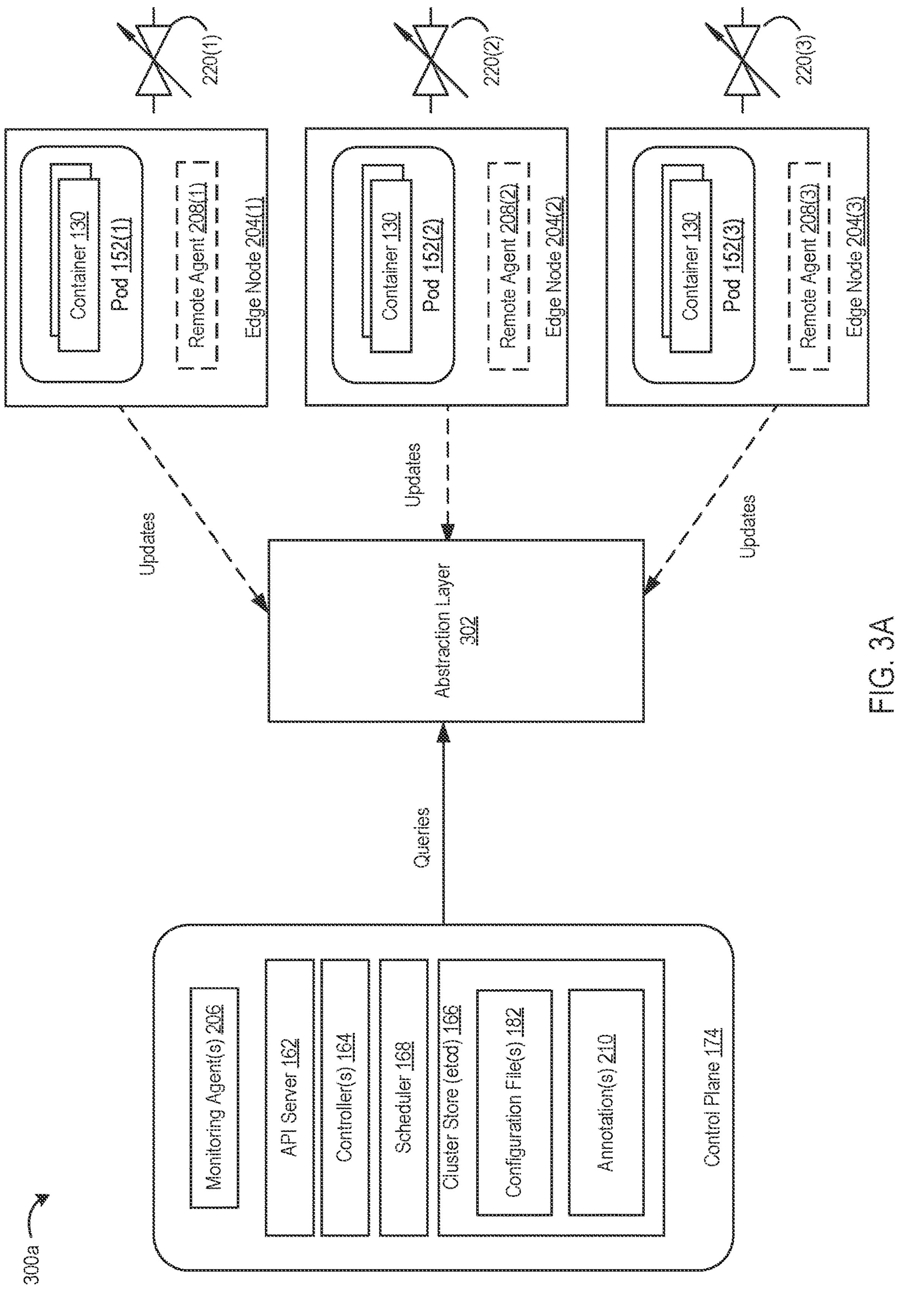
FIG. 3A illustrates example monitoring of components in a container orchestration system using an abstraction layer, according to an example embodiment of the present disclosure.

FIG. 3A illustrates example monitoring of disconnected nodes, and their components, in a container orchestration system 300*a* using an abstraction layer. Similar to container orchestration system 200, container orchestration system 300*a* includes a control plane 174 and three worker nodes deployed at various edge locations (e.g., edge nodes 204(1)-204(3)). Each edge node 204 may be running one or more applications (e.g., in containers 130 of pods 152) to manage control valves 220(1)-220(3) in a factory. To monitor application performance at each of these edge nodes 204, as well as a state and/or health of each of the components deployed at the edge (e.g., edge nodes 204, pods 152, and containers 130) and used to run the containerized applications, one or more monitoring agents 206 are deployed on control plane 174.

Unlike container orchestration system 200, however, container orchestration system 300*a* further includes an abstraction layer 302. Abstraction layer 302 may be running in a same data center as control plane 174, in a same data center as one or more of the edge nodes 204, or in a data center different than data centers where the control plane 174 and the edge nodes 204 are running. Abstraction layer 302 includes one or more proxy components. Each proxy component may be acting as a proxy for one or more of the disconnected components. Each proxy component may be a stateful proxy, or in other words, represent a state of one or more disconnected components for which it is a proxy.

In this example, a single proxy component may exist in abstraction layer 302. The single proxy component may be a node proxy acting as a proxy for edge node 204(1), edge node 204(2), and edge node 204(3).

As another example, three proxy components may exist in abstraction layer 302. Each of the three proxy components may be a node proxy acting as a proxy for edge node 204(1), edge node 204(2), or edge node 204(3) separately.

Abstraction layer 302 may be configured to obtain information about a state, health, and/or performance of (e.g., via the collection of monitoring data, such as logs generated at) each of the disconnected edge nodes 204 in container orchestration system 300*a*. In certain embodiments, abstraction layer 302 obtains this information based on pulling/reading data from APIs published by edge nodes 204, when the disconnected components are connected to a network. In certain embodiments, abstraction layer 302 obtains this information based on edge nodes 204 (or remote agents 208 deployed on edge nodes 204) providing this data to abstraction layer 302. In some cases, the remote agents 208 provide this information to abstraction layer 302 based on one or more requests for such information from abstraction layer 302. In some cases, the remote agents 208 are configured to periodically (e.g., at regular intervals) provide this information to abstraction layer 302. For example, remote agent 208(2) deployed on edge node 204(2), associated with a the node proxy in abstraction layer 302, may be configured to provide updated information to abstraction layer 302 every five minutes based on a configured ability of edge node 204(2) to connect to a network every five minutes (e.g., used to improve security of edge node 204(2) such that other entities cannot always connect to edge node 204(2)).

In certain embodiments, monitoring agent(s) 206 generate queries intended for disconnected components in container orchestration system 300*a* to receive monitoring data (e.g., information about a state, health, and/or performance) from these disconnected components. Each query generated by monitoring agent(s) 206, that is intended for one or more disconnected components associated with a proxy component in abstraction layer 302, may be intercepted by abstraction layer 302. The node proxy of abstraction layer 302 may service the query based on information maintained for edge nodes 204.

The node proxy of abstraction layer 302 may have a reliable connection to the network and thus be able to continuously communicate with controllers 154 on control plane 174, such as a node controller configured to regularly test the reachability of nodes, such as edge nodes 204, in the cluster. As such, the node controller may be tricked into believing that edge nodes 204 are continuously reachable based on communicating with the node proxy.

Figure 3B:
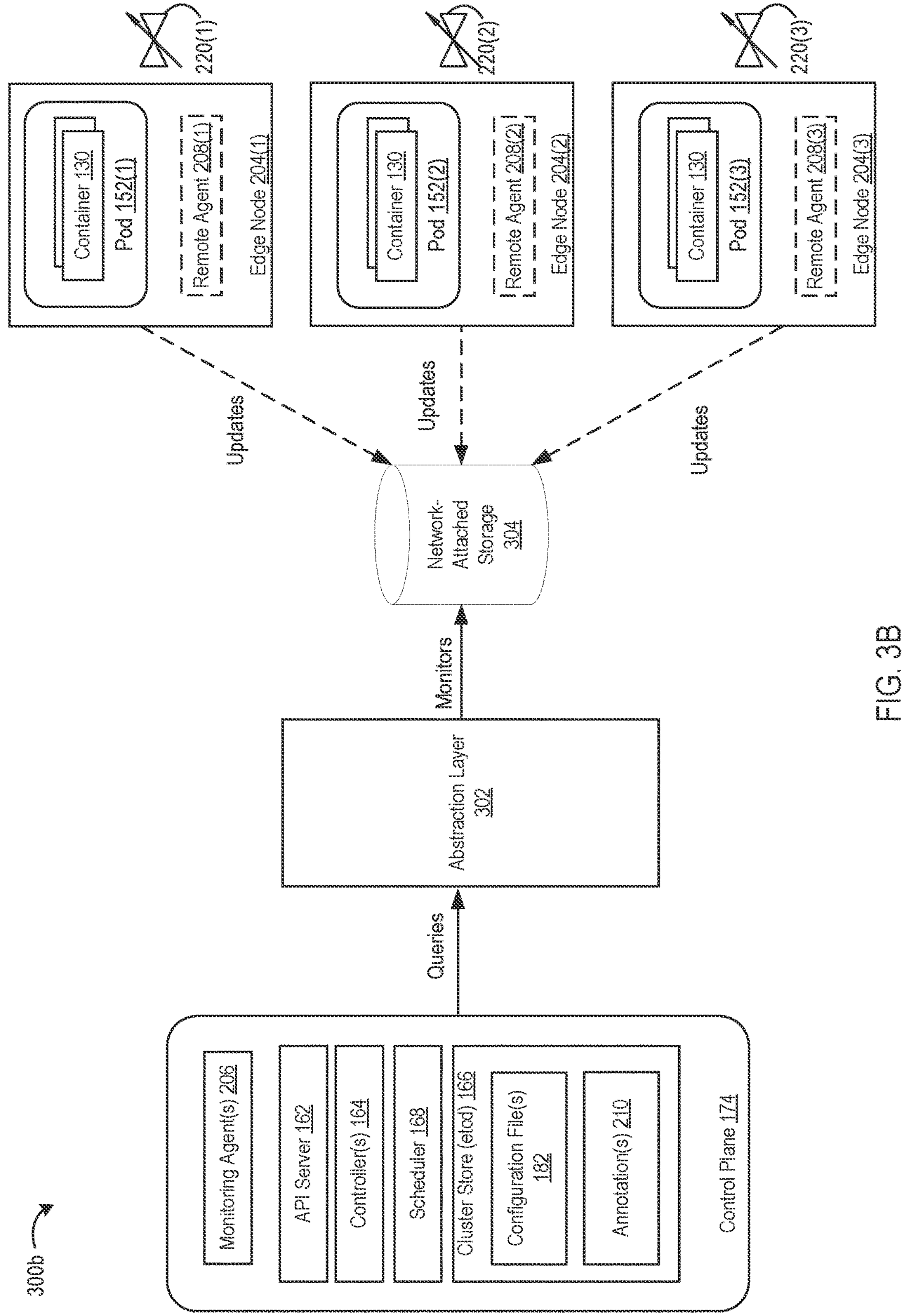
FIG. 3B illustrates example monitoring of components in a container orchestration system using an abstraction layer and network attached storage, according to an example embodiment of the present disclosure.

FIG. 3B illustrates example monitoring of components in a container orchestration system 300*b* using an abstraction layer and network attached storage, according to an example embodiment of the present disclosure. Similar to container orchestration system 300*a*, an abstraction layer 302 is introduced to trick controllers 164 (e.g., such as a node controller) and monitoring agent(s) 206 deployed on control plane 174 into believing that edge nodes 204 are continuously reachable for receiving monitoring data. Different from orchestration system 300*a*, however, in container orchestration system 300*b*, disconnected components (and/or remote agents 208 running on edge nodes 204 where these disconnected components are deployed) are configured to provide updated information associated with the disconnected components to network-attached storage 304, instead of directly to abstraction layer 302. Network-attached storage 304 comprises one or more storage devices connected to a network used to provide a central location for storage of data from multiple disconnected components. In particular, each disconnected component and/or remote agent 208 in container orchestration system 300*b* may securely connect to network-attached storage 304 to provide this information.

In this embodiment, proxy components in abstraction layer 302 may be configured to monitor for changes/updates to network-attached storage 304. Changes and/or updates to network-attached storage 304 may be initiated by one or more disconnected components and/or remote agents 208 providing updated information about a state, health, and/or performance of one or more disconnected components in container orchestration system 300*b*. When a change or updated is detected (e.g., based on the monitoring), proxy components may obtain this changed and/or updated information from network-attached storage 304.

In some cases, sending information about disconnected components to network-attached storage 304 provides a more secure way of updating proxy components of abstraction layer 302 than directly providing this information to abstraction layer 302 (e.g., as illustrated in FIG. 3A). Though FIG. 3B illustrates disconnected components providing updating information to a network-attached storage 304 and abstraction layer 302 monitoring for changes/updates to network-attached storage 304, in certain other embodiments, other types of storage and/or devices may be used as a central location for dumping and monitoring such information.

Figure 4:
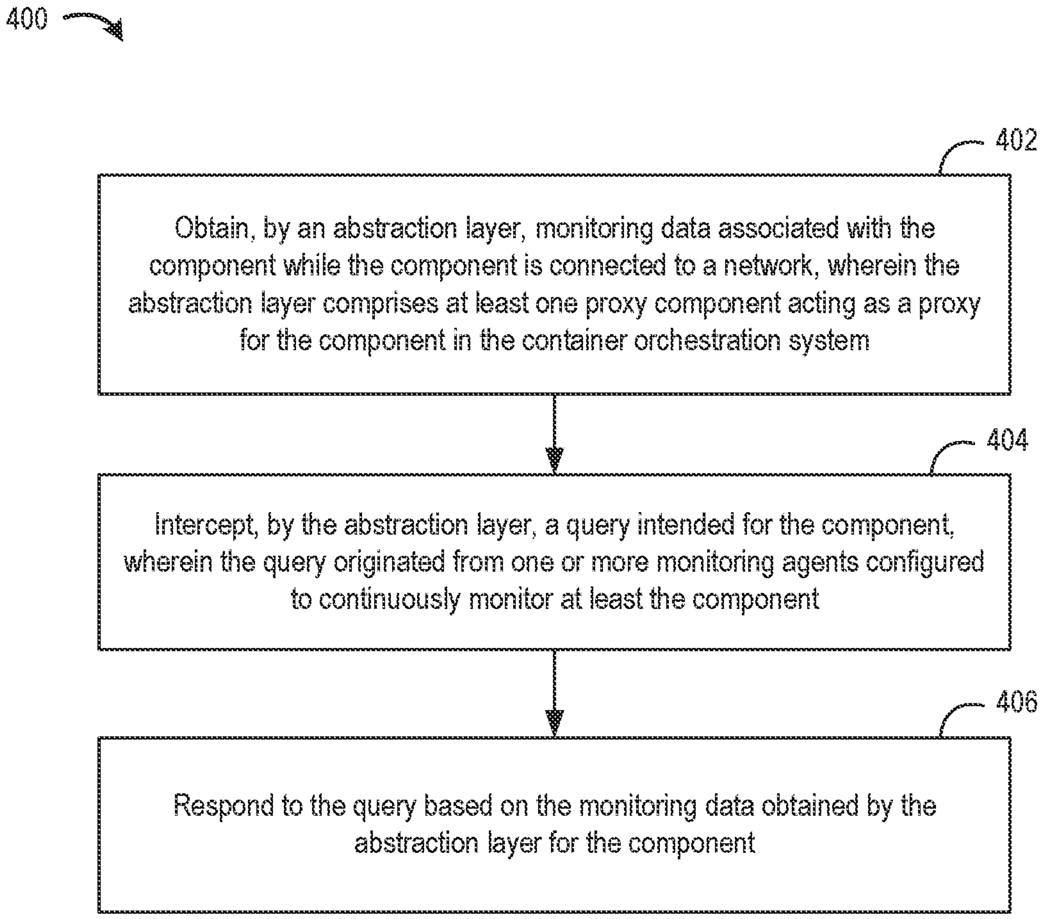
FIG. 4 is a flow diagram illustrating example operations for monitoring a disconnected component in a container orchestration system, according to an example embodiment of the present disclosure.

FIG. 4 illustrates an example method 400 for monitoring a disconnected component in a container orchestration system. For example, method 400 may be performed by container orchestration system 300*a* illustrated in FIG. 3A or container orchestration system 300*b* to monitor disconnected components, such as edge nodes 204 and/or components running on these edge nodes 204.

As illustrated in FIG. 4, method 400 begins, at operation 402, with obtaining, by an abstraction layer, monitoring data associated with the component while the component is connected to a network, wherein the abstraction layer comprises at least one proxy component acting as a proxy for the component in the container orchestration system.

Method 400 proceeds, at operation 404, with intercepting, by the abstraction layer, a query intended for the component, wherein the query originated from one or more monitoring agents configured to continuously monitor at least the component.

Method 400 proceeds, at operation 406, with responding to the query based on the monitoring data obtained by the abstraction layer for the component.

It should be understood that, for any process described herein, there may be additional or fewer steps performed in similar or alternative orders, or in parallel, within the scope of the various embodiments, consistent with the teachings herein, unless otherwise stated.

The various embodiments described herein may employ various computer-implemented operations involving data stored in computer systems. For example, these operations may require physical manipulation of these quantities may take the form of electrical or magnetic signals, where they or representations of them are capable of being stored, transferred, combined, compared, or otherwise manipulated. Further, such manipulations are often referred to in terms, such as producing, identifying, determining, or comparing.

Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system-computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in user space on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O. The term "virtualized computing instance" as used herein is meant to encompass both VMs and OS-less containers.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

I claim:

1. A method for monitoring a component in a container orchestration system, the method comprising:

obtaining, by an abstraction layer, monitoring data associated with the component while the component is connected to a network, wherein the abstraction layer comprises at least one proxy component acting as a proxy for the component in the container orchestration system;

intercepting, by the abstraction layer, a query intended for the component, wherein the query originated from one or more monitoring agents configured to continuously monitor at least the component; and responding, by the abstraction layer on behalf of the component, to the query based on the monitoring data obtained by the abstraction layer for the component.

2. The method of claim 1, further comprising:

intercepting, by the abstraction layer, a query intended for the component, wherein the query originated from a node controller configured to determine a responsiveness of the component; and responding, by the abstraction layer, to the query on behalf of the component.

3. The method of claim 1, wherein:
the query intended for the component is intercepted by the abstraction layer when the component is disconnected from the network.

4. The method of claim 1, wherein obtaining, by the abstraction layer, the monitoring data associated with the component comprises:
reading data from application programming interfaces (APIs) published by the component while connected to the network.

5. The method of claim 1, wherein obtaining, by the abstraction layer, the monitoring data associated with the component comprises:
monitoring a storage for one or more updates to monitoring data stored in the storage for the component;
based on the monitoring, detecting the one or more updates to the monitoring data stored in the storage for the component; and
reading the monitoring data updated in the storage for the component.

6. The method of claim 5, wherein:
the storage comprises a network-attached storage.

7. The method of claim 5, wherein:
the one or more updates to the monitoring data stored in the storage are caused by the component or monitoring agents deployed on the component.

8. The method of claim 1, wherein:
the component comprises an edge node.

9. The method of claim 1, wherein:
the monitoring data associated with the component comprises application logs for one or more applications running on the component.

10. A system comprising: one or more processors; and at least one memory, the one or more processors and the at least one memory configured to:
obtain, by an abstraction layer, monitoring data associated with a component in a container orchestration system while the component is connected to a network, wherein the abstraction layer comprises at least one proxy component acting as a proxy for the component in the container orchestration system;
intercept, by the abstraction layer, a query intended for the component, wherein the query originated from one or more monitoring agents configured to continuously monitor at least the component; and
respond, by the abstraction layer on behalf of the component, to the query based on the monitoring data obtained by the abstraction layer for the component.

11. The system of claim 10, wherein the one or more processors and the at least one memory are further configured to:
intercept, by the abstraction layer, a query intended for the component, wherein the query originated from a node controller configured to determine a responsiveness of the component; and
respond, by the abstraction layer, to the query on behalf of the component.

12. A non-transitory computer-readable medium comprising instructions that, when executed by one or more processors of a computing system, cause the computing system to perform operations for monitoring a component in a container orchestration system, the operations comprising:
obtaining, by an abstraction layer, monitoring data associated with the component while the component is connected to a network, wherein the abstraction layer comprises at least one proxy component acting as a proxy for the component in the container orchestration system;
intercepting, by the abstraction layer, a query intended for the component, wherein the query originated from one or more monitoring agents configured to continuously monitor at least the component; and
responding, by the abstraction layer on behalf of the component, to the query based on the monitoring data obtained by the abstraction layer for the component.

13. The non-transitory computer-readable medium of claim 12, wherein the operations further comprise:
intercepting, by the abstraction layer, a query intended for the component, wherein the query originated from a node controller configured to determine a responsiveness of the component; and
responding, by the abstraction layer, to the query on behalf of the component.

14. The non-transitory computer-readable medium of claim 12, wherein:
the query intended for the component is intercepted by the abstraction layer when the component is disconnected from the network.

15. The non-transitory computer-readable medium of claim 12, wherein obtaining, by the abstraction layer, the monitoring data associated with the component comprises:
reading data from application programming interfaces (APIs) published by the component while connected to the network.

16. The non-transitory computer-readable medium of claim 12, wherein obtaining, by the abstraction layer, the monitoring data associated with the component comprises:
monitoring a storage for one or more updates to monitoring data stored in the storage for the component;
based on the monitoring, detecting the one or more updates to the monitoring data stored in the storage for the component; and
reading the monitoring data updated in the storage for the component.

17. The non-transitory computer-readable medium of claim 16, wherein:
the storage comprises a network-attached storage.

18. The non-transitory computer-readable medium of claim 16, wherein:
the one or more updates to the monitoring data stored in the storage are caused by the component or monitoring agents deployed on the component.

19. The non-transitory computer-readable medium of claim 12, wherein:
the component comprises an edge node.

20. The non-transitory computer-readable medium of claim 12, wherein:
the monitoring data associated with the component comprises application logs for one or more applications running on the component.

* * * * *